United States Patent [19]

Kurtz et al.

[11] Patent Number: 4,483,196
[45] Date of Patent: Nov. 20, 1984

[54] TUBULAR TRANSDUCER STRUCTURES

[75] Inventors: Anthony D. Kurtz, Englewood; Joseph R. Mallon, Jr., Franklin Lakes; Timothy A. Nunn, Ridgewood, all of N.J.

[73] Assignee: Kulite Semiconductor Products, Inc., Ridgefield, N.J.

[21] Appl. No.: 472,851

[22] Filed: Mar. 7, 1983

[51] Int. Cl.³ .............................................. G01L 9/06
[52] U.S. Cl. ...................................... 73/730; 73/727; 128/675; 338/4
[58] Field of Search ................. 73/730, 727, 726, 720, 73/721, 719; 128/675, 674, 673, 672; 338/4, 42

[56] References Cited

U.S. PATENT DOCUMENTS 2,420,148  5/1947  Ostergren ........................... 73/730
3,128,628  4/1964  Lebow ................................ 73/730
3,724,274  4/1973  Millar ................................. 338/4

Primary Examiner—Donald O. Woodiel
Attorney, Agent, or Firm—Arthur L. Plevy

[57] ABSTRACT

A pressure transducer employs a tubular glass structure of a "D" shaped cross section, with the arcuate section of the "D" shaped configuration being substantially thicker than the base section. A sensor array is positioned on the underside of the base section while a pressure conducting fluid is directed through the tubular member to provide deflection of the base to cause the sensor array to provide an output indicative of pressure variations in the fluid medium. The sensor array as positioned on the underside of the base is both electrically and mechanically isolated from the pressure conducting medium.

19 Claims, 9 Drawing Figures

TUBULAR TRANSDUCER STRUCTURES

BACKGROUND OF INVENTION

This invention relates to electro-mechanical transducers and more particularly to a tubular transducer structure employing a tubular diaphragm member.

The prior art is replete with a number of transducer structures which are primarily employed in the field of medical electronics. These transducer structures are utilized to measure various pressures of the human body to monitor various body functions. Essentially, a widely used type of device employs a housing having an inlet and outlet port. The ports communicate with each other via a cylindrical glass tube which has an aperture at the center. Bonded to the tube so as to close the aperture, is a silicon pressure transducer normally employing piezoresistive devices. In this manner, the pressure to be monitored is applied to the input port while the output port is coupled back to the body of a patient or to a reservoir. Essentially, a saline solution is caused to flow through the tube whereby the pressure exerted on the silicon diaphragm is the pressure of interest. Such devices experience considerable problems in regard to their particular use.

First, as one can ascertain, the silicon diaphragm is relatively expensive and based on the structure, the diaphragm is not isolated from the saline solution. In this manner, a protective coating must be emplaced over the diaphragm 20 so that the solution will not be deleterious to the silicon. In order to protect the device, a gel is coated over the diaphragm. These gels are very difficult to apply and are further very difficult to sterilize. Sterilization is a necessity as the transducer structure has to be sterilized before being used to monitor a body function. The gel must be extremely inert so as not to produce any adverse reactions to the patient, and therefore it has to be relatively pure.

In addition to aforesaid protective coating or alternately isolating electronics is sometimes employed to provide or enhance the required electrical isolation. Such electronics serves to electrically isolate the patient from electrical biasing circuits by the use of appropriate circuitry. Such electronics are expensive and are cumbersome to use with existing patient monitoring apparatus and are considered undesirable from a user standpoint.

Apart from the above considerations, the transducers which are presently employed such as those indicated above must be electrically isolated from the body of the patient. In this manner any electrical impulses to which the patient's body may be subjected to may undesirably couple to the transducer and destroy the same. This problem is associated with the further problem that the transducer must further be isolated from the patient's body as it would be undesirable to subject the patient to any biasing source necessary for transducer operation.

As indicated above, such transducers are therefore associated with a great many problems which have not been adequately solved to the extent that present medical transducers are extremely expensive and difficult to manufacture and maintain.

It is therefore an objective of the present invention to provide a transducer which exhibits reliable operation and which offers isolation and essentially operates to circumvent many of the above described problems.

BRIEF DESCRIPTION OF THE PREFERRED EMBODIMENT

A pressure transducer apparatus, comprising a longitudinal tubular insulator member having an inlet and outlet port for enabling a pressure conducting fluid to propagate therethrough, said tubular member having at least one elongated flat surface area of a thickness substantially less than the thickness of the remaining surface area with said flat surface area adapted to deflect according to pressure variations in said medium, and a pressure sensor array positioned on said flat surface area on the side not in contact with said fluid medium.

DETAILED DESCRIPTION OF THE FIGURES

Figure 1:
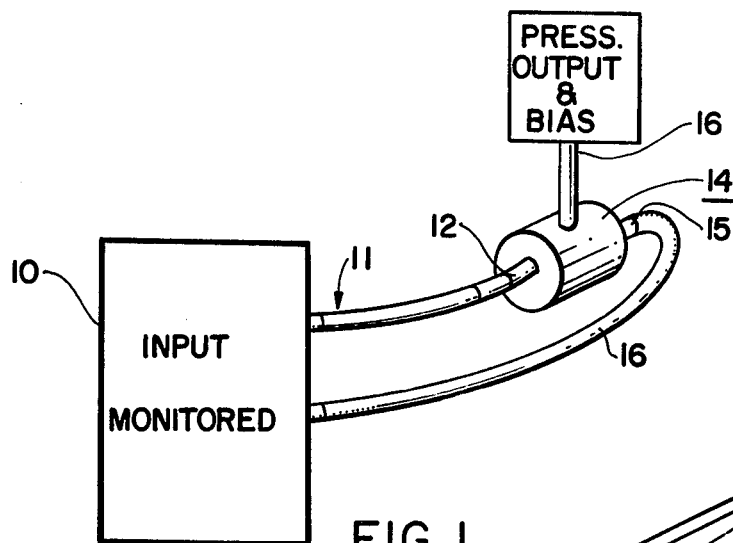
FIG. 1 is a perspective plan view of a pressure transducer monitoring a source of pressure.

Referring to FIG. 1, there is shown a block designated by reference numeral 10 and bearing the legend "Input Monitored". Essentially, the block 10 may be the body of the patient or any other suitable source which is to have the pressure or force monitored by a transducer. Essentially, the source to be monitored is coupled via a tube 11 to the input port 12 of a transducer 14. A transducer 14 is shown mounted in a cylindrical housing.

In any event, it is understood that any other geometrical configuration for the housing may suffice as well. The housing 14 includes an output port 15 which is coupled to a tube 16 to allow the circulation of a pressure conducting medium such as a suitable saline solution or other type of pressure transmitting fluid. Associated with the housing 14 is an output and bias port 16. Essentially, as will be explained, the port 16 allows one to apply bias to the pressure sensor and to receive the output leads from the sensor which indicate a signal proportional to the monitored pressure.

As is known in the art, most pressure sensor arrays employed in transducers utilize pressure sensitive resistors such as piezoresistive devices which are arranged in a Wheatstone bridge configuration as a full bridge consisting of four arms or a half bridge array. Many examples of such structures are well known in the art and are conventionally employed to monitor pressure in the field of medical electronics and so on.

Essentially, the transducer depicted in FIG. 1 may be of the prior art type as described above, and in this manner a glass tube is located within the internal hollow of the housing and couples the input port 12 to the output port 15.

Figure 2:
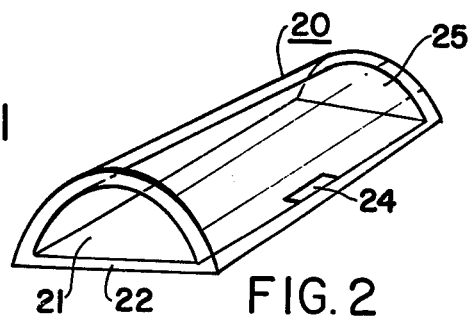
FIG. 2 is a perspective plan view of a tubular transducer structure according to this invention.

Referring to FIG. 2, there is shown a tubular assembly 20 according to the present invention. The tubular assembly 20 has an inlet port 21 which would be coupled to the input port 12 of the housing 14. The tubular member 20 is of a "D" shaped cross section whereupon the arcuate portion of the "D" is of a given thickness. The base portion 22 of the "D" is thinner than the arcuate section. Essentially, as will be explained, the base portion 22 acts as a diaphragm member and secured to the base portion 22 is a suitable strain or stress sensor 24.

Figure 3:
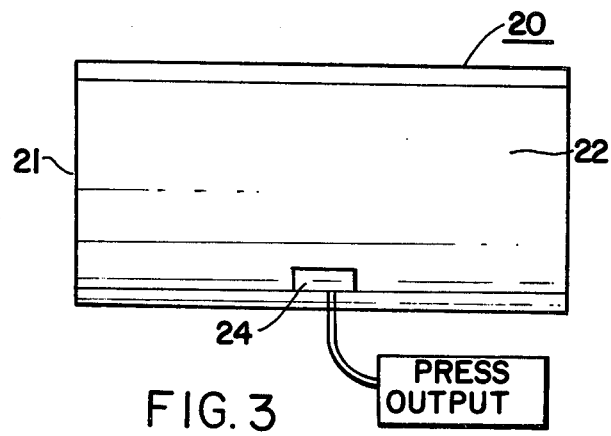
FIG. 3 is a bottom plan view of the transducer of FIG. 2.

As seen in FIG. 2, the sensor configuration 24 is secured to the underside of the base 22 near the center of the tubular member 20. The sensor array 24, as seen in FIG. 3, is also located near the edge of the base section 22 of the tubular member 20. The tubular member 20, as above indicated, is of a "D" shaped cross section with the inlet port 21 communicating with an outlet port 25.

Figure 4:
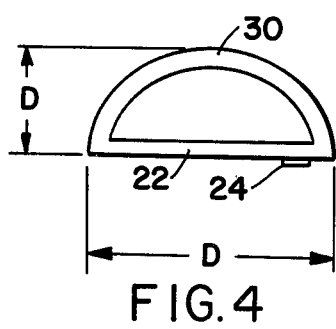
FIG. 4 is a front view of the transducer.

As indicated above, the base section 22 is thin as compared to the thickness of the arcuate side wall. In a typical embodiment the length of the tubular member 22 may be approximately 1¾ inches. The thickness 30 of the arcuate section is 75/1,000, while the thickness of the base section 22 is 10/1,000. The diameter "D", as seen in FIG. 4, of the tubular member is approximately ½ inch. The pressure sensor array 24 is then secured to the underside 22 of the tubular member 20 at the location described above and shown in FIG. 3.

Essentially, the transducer structure is positioned within the housing as 14 of FIG. 1 with the input port 21 communicating with port 12 and with the output port 25 communicating with port 15. It is of course understood and relatively obvious how coupling can be afforded to the "D" shaped aperture in order to position the tubular structure 20 within a suitable housing.

While the tubular structure 20 can accommodate various types of transducers, a preferable arrangement of a transducer is a closed bridge array. While the flat section is shown to run the entire length of the transducers it is understood that only a section need be flat. The transducer may be fabricated from an initially tubular member which is flattened and thinned only along a portion thereof.

Figure 5:
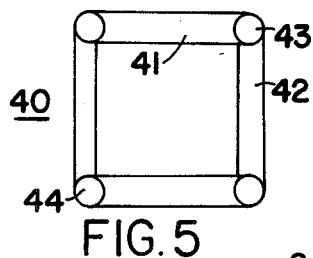
FIG. 5 is a top plan view of a sensor arrangement employed in this invention.

Referring to FIG. 5, there is shown a picture frame transducer 40. Essentially, the transducer 40 is a square configuration wherein each side consists of a separate piezoresistor as for example 41 and 42. Each corner of the square array has a contact area as 43 and 44 which enables application of a biasing source while the remaining contacts are indicative of an output taken from the bridge. The array 40 is fabricated from silicon and for example is produced from a separate process prior to depositing the same on the base surface 22 of the tubular member 20. It is significant that such a two step process maybe employed. If a silicon diaphragm with diffused piezoresistors is employed, then the diaphragm must be fabricated by conventional integrated circuit techniques. Such techniques become inefficient and costly if large area diaphragms are required. Many physiological measurements are of pressures 6 psi or less and large area diaphragms are required for proper performance. The fabrication of the glass part herein described is very economical. The sensors also are economical because of their extremely small size. Thus the structure described is sufficiently economical to be used as a disposable device. This is extremely desirable for todays typical hospital environment.

The square array 40 is conventionally fabricated from semiconductor techniques and may be secured to the tubular member 20 by means of anoidic or diffusion bonding, glass bonding, or by the use of a suitable epoxy or other bonding agent. The fabrication of an array as 40 is well known in the prior art, and there are many examples of techniques for forming the array. Essentially, the plane of the gage 40 as implemented with silicon is in the 100 plane with the direction either arm being in the 110 direction.

Figure 6:
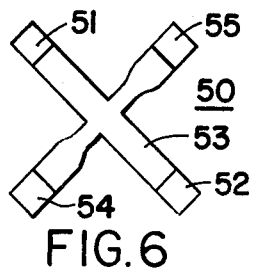
FIG. 6 is a top plan view of an alternate embodiment of a sensor arrangement.

Referring to FIG. 6, an alternate version of a suitable sensor array is shown. Essentially, the array depicted in FIG. 6 is a well known array and is sometimes referred to as a shear gage. The shear gage 50 is of a cross shaped configuration and fabricated from single piece of silicon. A biasing potential is applied to the contacts 51 and 52 associated with the arm 53 of the array. The contacts 54 and 55 are employed as outputs. The device depicted in FIG. 6 will produce an output voltage according to a pressure exerted on the array at the output terminals 54 and 55. As indicated, the shear gage 50 depicted in FIG. 6 is well known in the art and suitable examples of such configurations can be had by referring to a co-pending application entitled COMPENSATION AND NORMALIZATION APPARATUS FOR SHEAR PIEZORESISTIVE GAGE SENSORS, Ser. No. 419,903, filed on Sept. 20, 1982 now U.S. Pat. No. 4,442,717 by A. D. Kurtz, et al and assigned to the assignee herein.

This application further mentions many prior patents and articles pertinent to such devices, some of which also depict the gage shown in FIG. 5.

In regard to the tubular structure depicted above, it is noted that the entire tube 20 is fabricated from a suitable glass such as pyrex and as such is relatively inexpensive to produce and to shape. Glass, as is well known, is an extremely good insulator and due to the fact that the sensor array is deposited on the glass, it is completely isolated both electrically and mechanically from the fluid medium such as the saline solution which propagates from the input port 21 to the output port 22.

Based on the above noted dimensions and particularly due to the fact that the width of the base section 22 is more than seven times thinner than that of the arcuate section, the base section will flex or move in proportion to the force or pressure exerted upon the structure due to the fluid medium propagated through the same. The location of the gage near the edge allows the stress or pressure causing the movement of the base section to be monitored to thus cause the gage to provide an output which is directly proportional to applied pressure.

In order to further enchance the response to the tubular structure to pressure variations occurring in the fluid medium and to achieve higher output levels while maintaining linear response, one may fabricate a raised boss on the bottom surface of the transducer structure.

Figure 7:
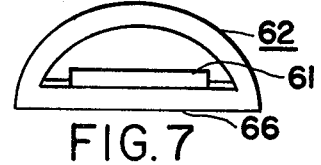
FIG. 7 is a front plan view of an alternate embodiment of a tubular transducer.

As seen in FIG. 7, the raised boss 61 is positioned on the inside surface of a "D" shaped glass tubular member 62.

Figure 8:
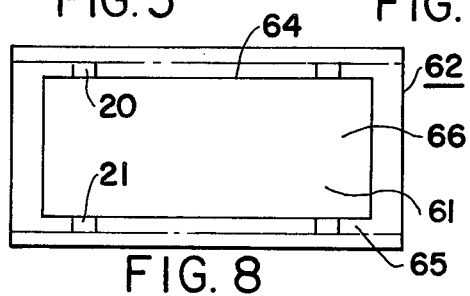
FIG. 8 is a bottom plan view of the transducer of FIG. 7.

As seen in FIG. 8, the raised boss creates a picture frame configuration for the bottom surface of the the transducer structure. The spaces as 64 and 65 are approximately 40/1,000 of an inch with the height of the boss 61 being about 50/1,000. This type of structure is also well known and is sometimes referred to as a picture frame transducer. Examples of similar structures may be had by referring to U.S. Pat. No. 4,236,137 entitled SEMICONDUCTOR TRANSDUCERS EM- PLOYING FLEXURE FRAMES, issued on Nov. 25, 1980 to A. D. Kurtz, et al and assigned to the assignee herein.

With the tubular transducer arrangement shown in FIGS. 6 and 7, the gages employed as 70 and 71 are longitudinal piezoresistive devices which are positioned over the thin outer peripheral section with their axes parallel to the short section of the structure. In this configuration the gages are again emplaced on the underside 66 of the straight base of the "D" so that they are again, both physically and electrically, isolated from the patient and from the fluid conducting medium. All forces which are transmitted by the fluid conducting medium cause the thinner base section to flex and therefore cause the piezoresistive devices to change or vary resistance according to the amount of flexure. All biasing leads for the various semiconductor arrays as well as any interconnection between the devices are made on the undersurface of the base section of the tubular member and hence are completely isolated both from the source of pressure to be monitored and from the fluid conducting medium.

Figure 9:
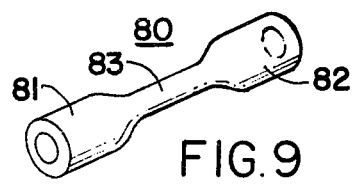
FIG. 9 is a perspective plan view of still another embodiment of a tubular transducer structure according to this invention.

Referring to FIG. 9, there is shown an alternate configuration of a tubular transducer member which may be employed in a pressure transducer configuration.

Essentially, the member 80 has a circular inlet section 81 and a circular outlet section 82. The circular sections permit coupling of the structure to conventional inlet and outlet ports found in most prior art transducers. Coupled between the Sections 81 and 82 is a "D" shaped tubular member 83 which has a suitable gage structure secured thereto as shown in FIGS. 2, 3, and 6, for example. These circular ends may be molded integrally with appropriate pressure fittings such as circular threads or Leur-lock type fittings to provide convenient means of attaching tubing, catheters, or valves or other hardware. Glass tubing may be conveniently molded to such complex shapes or alternatively coupling may be made to appropriate plastic hardware or parts.

It is of course understood that based on the above noted description, there are alternate embodiments which may be envisioned by those skilled in the art. According to the structure above described, there is provided an inexpensive and reliable transducer assembly. The assembly is isolated from the pressure medium while the glass tube also provides a high degree of electrical isolation. The sensor arrays which are compatible with the structure are capable of being mass produced in great quantities by known techniques which therefore substantially reduce the overall cost of the device as compared to prior art structures employed for the same purposes.

We claim:

1. A pressure transducer apparatus, comprising;
   a longitudinal tubular insulator member having an inlet and outlet port for enabling a pressure conducting fluid to propagate therethrough, said tubular member having at least one elongated flat surface area of a thickness substantially less than the thickness of the remaining surface area with said flat surface area adapted to deflect according to pressure variations in said medium, and a pressure sensor array positioned on said flat surface area on the side not in contact with said fluid medium wherein said longitudinal tubular member is of a "D" shaped cross section, with the arcuate portion of said "D" being substantially thicker than the base portion with said base portion being said flat surface area.

2. The pressure transducer apparatus according to claim 1, wherein said longitudinal tubular insulator member is fabricated from glass.

3. The pressure transducer according to claim 1, wherein said sensor array is positioned on the underside of said base portion near one edge.

4. The pressure transducer according to claim 3, wherein said sensor array is a picture frame array of piezoresistive sensor elements.

5. The pressure transducer according to claim 3, wherein said sensor array is a shear gage transducer fabricated from a single piece of silicon and of an X shaped configuration.

6. The pressure transducer according to claim 1, wherein said pressure conducting fluid is a saline solution.

7. The pressure transducer according to claim 1, wherein said flat surface area contains a raised boss separated from said remaining surface area by a given area of said substantially less thickness with said sensor array positioned over said given area.

8. A pressure transducer apparatus for mounting in a housing having an internal hollow with an inlet opening for receiving a pressure conducting fluid and an output opening for discharging said fluid, said transducer comprising;
   a longitudinal tubular insulator member having an inlet coupled to said inlet opening and an outlet coupled to said outlet opening with said inlet and outlet communicating via the hollow of said tubular member of a "D" shaped cross section, with the arcuate portion of said "D" being thicker than the base portion of said "D", with a pressure sensor array positioned on said base portion and located on the surface thereof not in communication with said hollow.

9. The pressure transducer apparatus according to claim 8, wherein said tubular member is fabricated from glass.

10. The pressure transducer according to claim 9, wherein said glass is Pyrex.

11. The pressure transducer according to claim 8, wherein said arcuate portion of said "D" shaped member is at least five times thicker than said base portion.

12. The pressure transducer apparatus according to claim 8, wherein said sensor array is positioned relatively near the center of said base nearer one side thereof.

13. The pressure transducer apparatus according to claim 12, wherein said sensor array is a piezoresistive picture frame array.

14. The pressure transducer apparatus according to claim 12, wherein said sensor array is a shear gage transducer fabricated from a single piece of silicon and of an X shaped configuration.

15. The pressure transducer apparatus according to claim 8, further including a raised boss area located on said base portion of said tubular member and extending into said hollow, with said boss separated from the walls of said arcuate position by a predetermined area, with said sensor array positioned on the opposite side of said base portion and overlying said predetermined area.

16. The pressure transducer apparatus according to claim 15, wherein said sensor array includes at least one longitudinal piezoresistive sensor element.

17. The pressure transducer according to claim 15, wherein said boss is of a rectangular configuration.

18. The pressure transducer apparatus according to claim 8, wherein said pressure conducting fluid is a saline solution.

19. The pressure transducer according to claim 8, wherein said sensor array is glass bonded to said base portion.

* * * * *